G. F. HAMMER.

Automatic Cylinder-Cock.

No. 9,058. Reissued Jan. 27, 1880.

5.

6.

Attest

Collins Ford Jr.

Edgar J. Gross

Inventor.

Gustav F. Hammer

By John H. Hill

Attorney

UNITED STATES PATENT OFFICE.

GUSTAV F. HAMMER, OF CINCINNATI, OHIO.

AUTOMATIC CYLINDER-COCK.

SPECIFICATION forming part of Reissued Letters Patent No. 9,058, dated January 27, 1880.

Original No. 190,680, dated May 15, 1877. Application for Reissue filed November 24, 1879.

*To all whom it may concern:*

Be it known that I, GUSTAV F. HAMMER, of Cincinnati, Hamilton county, Ohio, have invented certain new and useful Improvements in Automatic Cylinder-Cocks, of which the following is a specification.

This invention relates to that class of devices which are employed for draining engine-cylinders by means of a pair of reciprocating valves automatically operated by means of the live steam in such a manner as to discharge the water of condensation from the exhaust end of the cylinder, while at the same time any waste of steam is prevented at the receiving end of said cylinder.

Heretofore such devices have consisted, essentially, of a barrel or shell communicating with both ends of the cylinder by suitable pipes, the reciprocating valves being housed within said barrel and rigidly united to each other with a stem or rod, in order that the closure of one valve consequent upon the pressure of steam against the same would open the other valve, and thus secure the drainage of the exhaust end of the cylinder.

This defective construction rendered it impossible to adjust the cock to the requirements of various kinds of steam-engines—or, in other words, a sufficient stroke of these connected valves to insure complete drainage of a large cylinder would afford too great an area of discharge for a small engine, and vice versa.

In order to overcome these objections, I secure the stem or rod only to one valve and insert it in a suitable bore or channel made longitudinally of the other valve, the penetration of said stem being regulated by an adjustable screw or stop tapped into the outer end of said channeled valve, as hereinafter more fully described.

Figure 1:
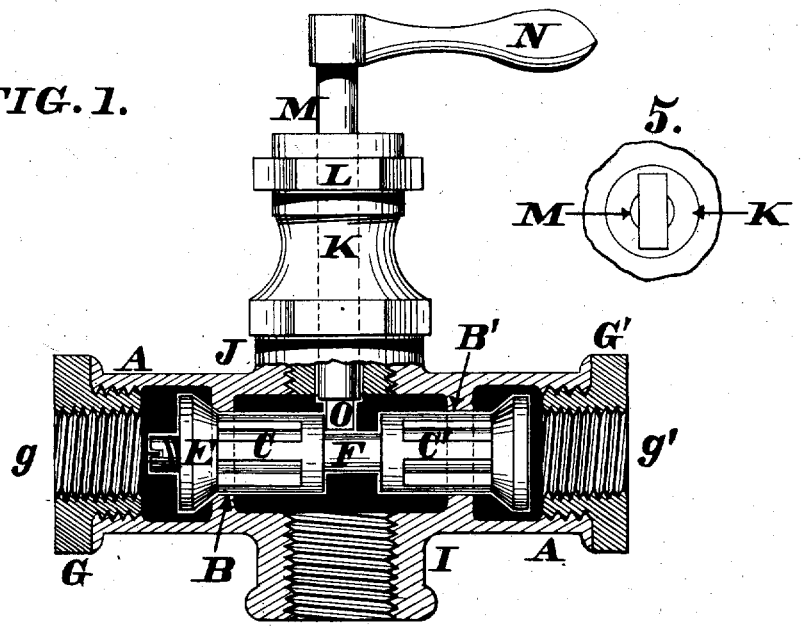
Figure 2:
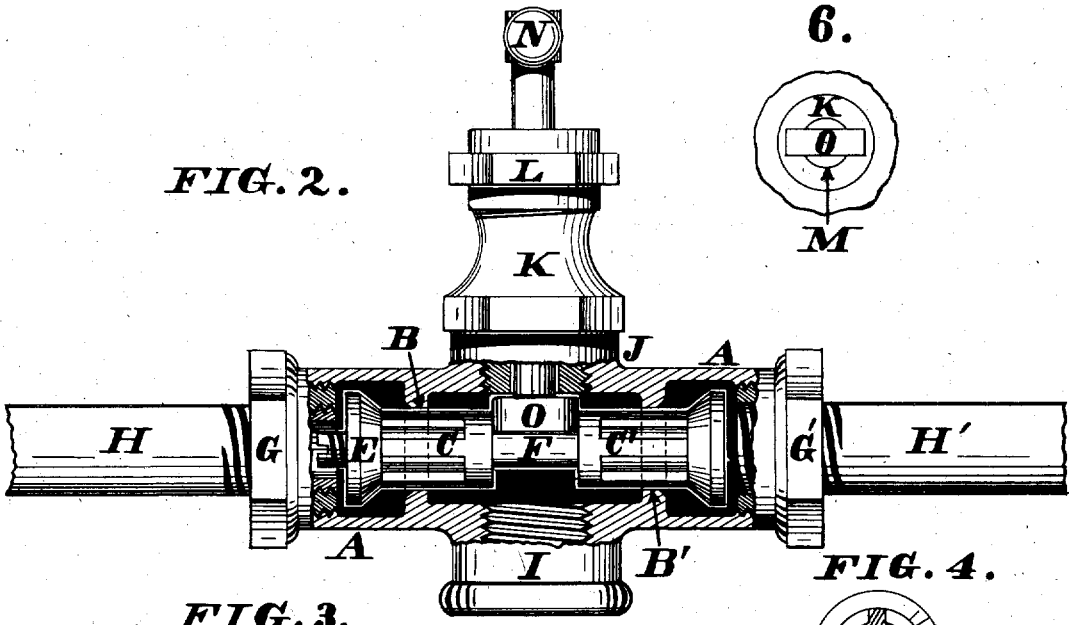
Figure 3:
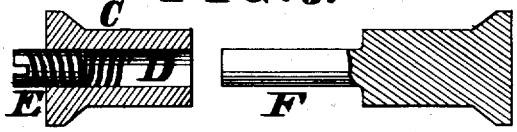
Figure 4:
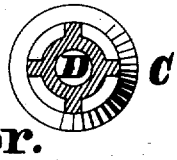

In the annexed drawings, Figure 1 is an axial section of my improved cylinder-cock, the controlling-handle being set so as to allow free play of the loosely-coupled reciprocating valves. Fig. 2 is a similar section, but showing said handle turned so as to force both of the valves away from their respective seats. Fig. 3 is a vertical section of the valves removed from the shell or barrel and separated from each other. Fig. 4 is a transverse section of the channeled valve.

Diagrams 5 and 6 represent the two different positions of the bit at the lower end of the controlling-handle.

A represents a shell or barrel, which is preferably cylindrical, and is provided with two perforated partitions or heads, B B′, whose outer surfaces are counterbored, so as to serve, respectively, as seats for the loosely-coupled valves C C′. These valves are furnished with longitudinal wings or ribs that centralize said valves in their seats B B′, and also afford channels for the escape of condensed steam, &c., as clearly shown in Fig. 4. Of these valves, the one, C, is pierced from end to end with an axial bore or channel, D, into whose outer end is tapped an adjustable screw or plug or other stop, E, as seen in Fig. 3. Adapted to slide freely in this longitudinal bore is an axial stem or rod, F, cast with or otherwise secured to valve C′. Screwed to the ends of barrel A are couplings G G′, having female threads *g g′* for engagement of pipes H H′, that communicate with the ends of the steam-cylinder to which the cock is applied. The under side of this barrel has a neck, I, to which is screwed the pipe that conducts the water of condensation away from the engine. Projecting from the upper side of said barrel is another neck, J, to which is screwed a cap, K, the latter being surmounted with a stuffing-box, L. Occupying an axial position within these members J K L of the cock is a stem, M, having a handle, N, at top and a flat bit, O, at its lower or concealed end.

My cylinder-cock is adapted for use and operates in the following manner: Previous to starting the engine, handle N is turned so as to dispose bit O longitudinally of barrel A, as seen in Fig. 2 and Diagram 6. This act withdraws stem F a sufficient distance out of channel D to compel valves C C′ to recede from each other far enough to uncover the perforations of heads B B′, in order that both ends of the steam-cylinder may now be drained through pipes H H′ and neck I. As soon, however, as the cylinder becomes heated up, handle N is turned so as to dispose the bit O transversely of barrel A, as seen in Fig. 1 and Diagram 5, thereby leaving the valves C C′ at liberty to act automatically.

To illustrate this automatic action of the cock, I will suppose the pressure of live-steam in the engine-cylinder is brought to bear against the outer end of valve C, so as to force the latter up snugly against its seat B. Evidently this seating of said valve effectually prevents any escape of live steam through the cock, while at the same time the motion communicated to valve C is, by means of plug E and stem F, transferred to the other valve, C′, and consequently the latter is forced away from its seat B′. Now, as this valve C′ is in communication with pipe H′ leading to the exhaust end of the cylinder, it is apparent the water of condensation will be forced through the orifice in seat B′, and then escape at waste-pipe I. At the next stroke of the engine this action of the device is exactly reversed—that is to say, valve C′ is forced to its seat by the live-steam, while valve C is opened by the thrust of stem F against stop E, and the water of condensation now escapes through the orifice in head B.

The above-described reciprocating movements of the two loosely-coupled valves are automatically repeated at every stroke of the piston, and the result is the complete drainage of the cylinder without requiring any attention of the engineer.

In case the cock is applied to a large cylinder which condenses an unusual amount of steam, plug E is screwed into bore D, so as to effect a greater separation of valves C C′, and therefore said valves will be shifted farther from their respective seats at each stroke of the engine, and thus afford an ample area for the escape of water; but for application to smaller cylinders, plug E is adjusted outwardly to allow stem F entering bore D a greater distance, which adjustment causes valves C C′ to approach each other, and consequently said valves will be removed from their seats but a very slight distance at every stroke of the piston.

By thus adjusting these valves to the specific requirements of each engine I effectually prevent any violent slamming of them against their respective seats, and I also obviate the disagreeable noise that results when the area of the discharge-valve is not exactly proportioned to the capacity of the steam-cylinder.

I am aware that it is not new to construct automatic cylinder-cocks with two rigidly-united reciprocating valves, and therefore my claims are limited to the devices D E F, or their equivalents, whereby the valves C C′ are loosely coupled together, and are capable of being adjusted so as to render such cocks applicable to engines of any capacity.

Having described my invention, what I claim is—

1. In an automatic cylinder-cock, a pair of loosely-coupled reciprocating valves, in combination with corresponding seats and suitable means of discharge, substantially as described.

2. In an automatic cylinder-cock, a pair of adjustable and loosely-coupled reciprocating valves, as C C′, when combined with rigidly-connected seats B B′, and a central discharge-opening, I, substantially as herein described, and for the purpose set forth.

3. In combination with barrel A and seats B B′ of an automatic cylinder-cock, a pair of adjustable and loosely-coupled reciprocating valves, substantially as herein described, and for the purpose set forth.

4. An automatic cylinder-cock consisting, essentially, of barrel A, seats B B′, and reciprocating valves C C′, one of said valves being furnished with an adjustable stop, E, and a longitudinal bore, D, which bore is traversed by the stem F of the other valve, substantially as herein described, and for the purpose set forth.

In testimony whereof I have hereunto set my hand.

GUSTAV F. HAMMER.

Witnesses:

COLLIN FORD, Jr.,
EDGAR J. GROSS.